United States Patent [19]
Alewitz

[11] 3,891,530
[45] June 24, 1975

[54] ANODE-FITTING ASSEMBLY

[75] Inventor: Sam Alewitz, Painesville, Ohio

[73] Assignee: Perfection Corporation, Madison, Ohio

[22] Filed: Nov. 29, 1972

[21] Appl. No.: 310,561

[52] U.S. Cl. ............................ 204/197; 204/297 R
[51] Int. Cl. ............................................. C23f 13/00
[58] Field of Search .......... 204/147, 148, 196, 197; 174/94 S; 339/96

[56] References Cited
UNITED STATES PATENTS

| | | | |
|---|---|---|---|
| 2,486,936 | 11/1949 | Fergus | 204/197 |
| 2,740,757 | 4/1956 | Craver | 204/197 |
| 3,542,663 | 11/1970 | Alewitz | 204/197 |
| 3,718,571 | 2/1973 | Bidwell | 204/197 |
| 3,718,573 | 2/1973 | Bidwell | 204/197 |

Primary Examiner—T. Tung
Attorney, Agent, or Firm—Fay & Sharpe

[57] ABSTRACT

An anode-fitting assembly for use in hot water tanks, pipelines or the like wherein an interior metallic surface undergoes corrosion when exposed to electrolytic fluids such as air and water. The fitting element of the assembly is comprised of a hollow nipple or connector member adapted to be threadedly received within an opening of the water tank, pipeline or the like. A tubular intermediate member extends from the nipple. An impervious electrically insulating plastic covering is provided on the exposed external surface of the tubular intermediate member. The anode element is comprised of a cylindrical electrode telescoped within the tubular intermediate member of the fitting and secured thereto by joining means that permits the anode element to be assembled to the fitting element at any convenient time after assembly of the fitting and prior to installation of the anode-fitting assembly in the water tank, pipeline or the like. In the preferred embodiment an impervious fluid passageway is provided within the fitting element such that the anode-fitting assembly may be used as an anode holder and fluid outlet.

15 Claims, 12 Drawing Figures

PATENTED JUN 24 1975 3,891,530
SHEET 1
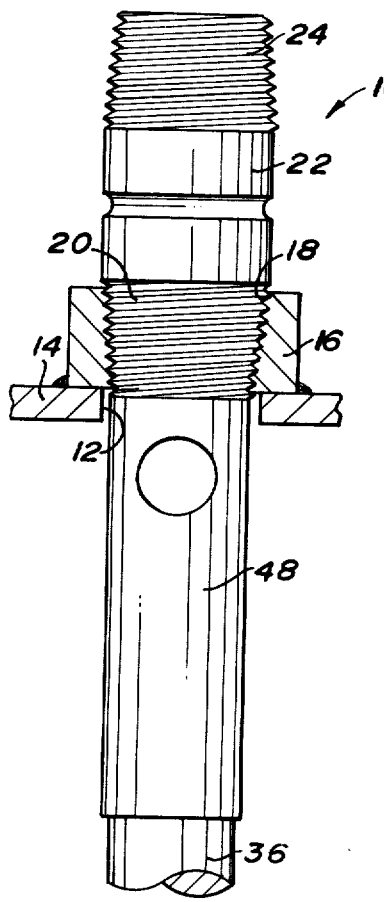
FIG. 1
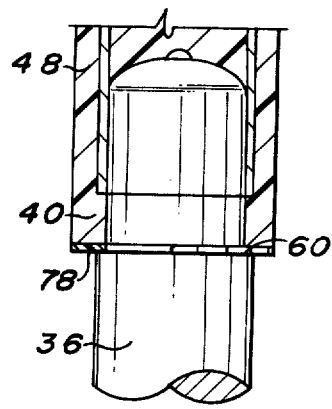
FIG. 4
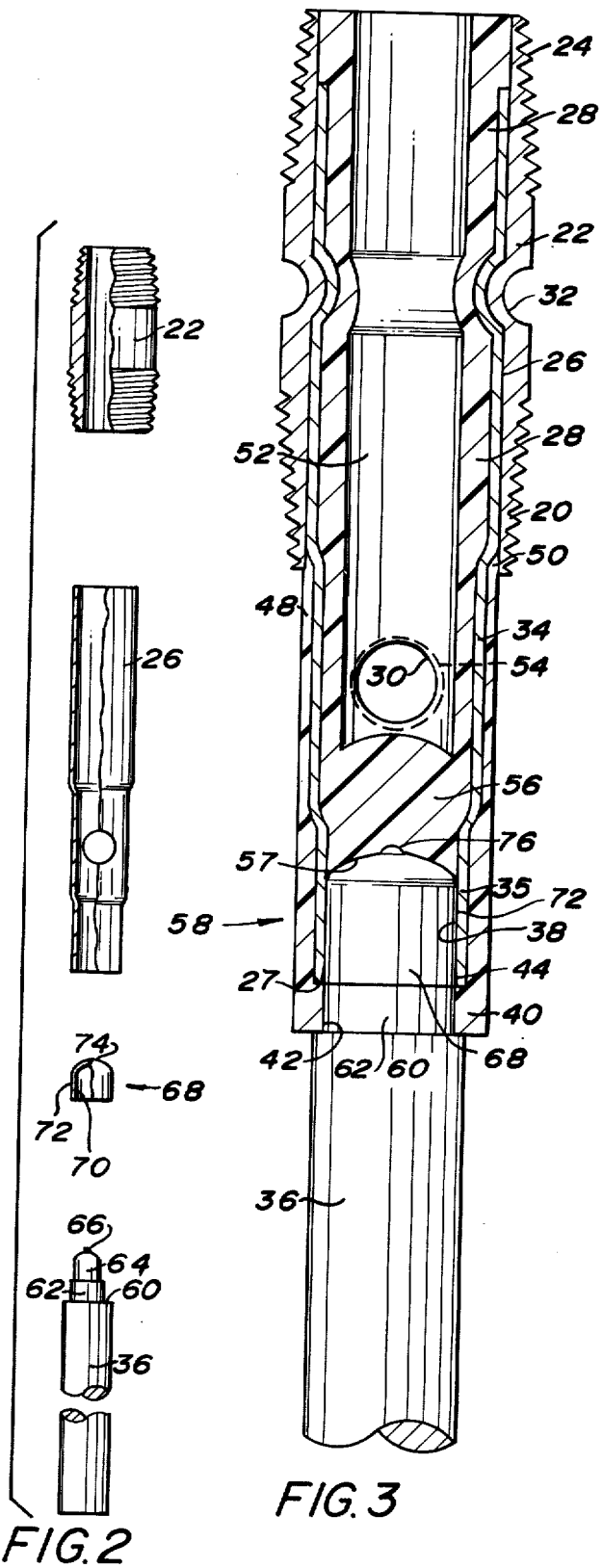
FIG. 2
FIG. 3

3,891,530

ANODE-FITTING ASSEMBLY

BACKGROUND OF THE INVENTION

This invention relates to an improved anode-fitting assembly for use in the cathodic protection of metal surfaces such as the internal wall of water heaters, water tanks, pipelines, gas lines, heat exchangers, and the like.

When metals, particularly iron, are exposed to air and water, they undergo corrosion. The corrosion reaction is slow in pure water, but rapid in solutions of electrolytes. The corrosion reaction can be explained as an electrochemical phenomenon. It appears that minute, primary electrical cells are set up when corrosion takes place. When iron is in contact with water containing electrolytes, iron ions immediately go into solution. From a somewhat oversimplified point of view, one may imagine that the attractive forces of the electrolyte molecules exceed the cohesive forces which hold the iron ions in their crystalline lattice. Every positive ion which goes into solution leaves one electron behind for each valence which the ion possesses. These electrons tend to collect at the less active portions of the iron (having a lower electrode potential) and combine with hydrogen ions to form hydrogen gas. Several methods of preventing or retarding corrosion have been proposed including alloying iron with certain other elements such as chromium or silicon and application of electrochemistry to produce cathodic protection.

This invention relates to electrochemical protection of iron and other metals through cathodic protection. The primary function of this invention is to provide a galvanic anode-fitting assembly adapted to be introduced into a water heater, pipeline, or the like. The anode element includes an electrode fabricated from a metal that is more active than the metal comprising the water heater, pipeline or the like. The more active metal is electrically connected to the metal to be protected. The difference in activity of the two metals induces a current to flow between them, producing corrosion of the more active metal and furnishing cathodic protection to the iron or less active metal.

DESCRIPTION OF PRIOR ART PATENT

In U.S. Pat. No. 3,542,663 to Sam Alewitz and assigned to Perfection Corporation, Madison, Ohio, the assignee of the entire interest herein, there is shown and described an anode-fitting combination in which the anode is received within the fitting member during manufacture of the combination and thereafter portions of the external surfaces of the fitting and anode are coated with an impervious electrically insulating plastic covering. Referring specifically to FIG. 3 of U.S. Pat. No. 3,542,663, it will be observed that covering 48 extends below the inner end 27 of the tubular intermediate member 26 and comes into contact with the external surface of electrode 36 thereby completely sealing the inner end 27 of the tubular intermediate member 26 and the upper portion of the electrode from electrolytic fluid. Once the cover 48 has been cast in place the anode-fitting combination as shown in FIG. 3 of U.S. Pat. No. 3,542,663 is then ready for installation in a water heater or other such structure.

From a handling and manufacturing point of view the anode-fitting structure as shown in FIG. 3 of U.S. Pat. No. 3,542,663 has a disadvantage in that the anode or electrode is integrally cast to the fitting at the time the impervious electrically insulating outer covering is put in place about the fitting. Thus, the entire anode-fitting combination as shipped from the point of manufacture is of considerable length due to the fact that the electrode or anode is attached to the fitting. Depending on the specific requirement of the anode-fitting combination, the length thereof may be on the order of 6 feet. The shipping of the anode-fitting combination is considerably more involved than is the shipping of the anode parts or fitting parts separately. Since, however, the water heater manufacturer does not usually have the capability of molding the covering 48 as shown in FIG. 3 of U.S. Pat. No. 3,542,663 (in order to join the electrode to the fitting), the assembly of the anode-fitting combination must be performed by the fitting manufacturer who necessarily must assume the transportation problems discussed above.

A further drawback in the manufacture of the type of structure shown in FIG. 3 of U.S. Pat. No. 3,542,663 is the fact that the anode or electrode member contributes a high proportion of the total cost of the anode-fitting combination. Thus, the fitting manufacturer in assemblying a structure such as is shown in FIG. 3 of U.S. Pat. No. 3,542,663 must assume a relatively large inventory of electrodes. The cost of such inventory is considerably in excess of the cost of the individual elements that make up the fitting portion of the anode-fitting combination. Thus, the fitting manufacturer has a considerable investment in electrode material not to mention its investment in plant, equipment, and material relating to the fitting elements themselves.

This invention relates to an anode-fitting assembly in which the anode element may be secured to the fitting element after molding of the fitting element has been accomplished. Thus, the anode-fitting assembly of this invention makes it possible for a water heater manufacturer or other user of anode-fitting assemblies to separately purchase the fitting elements from a fitting manufacturer while selecting anodes from a suitable supplier. The fitting manufacturer may then perform the manufacturing operations necessary to complete assembly of the fittings themselves without the necessity of attaching relatively expensive anodes to the fittings. The anodes may be purchased by the water heater manufacturer and assembled to the fitting members immediately prior to installation of the entire units in water heaters.

BRIEF DESCRIPTION OF THE INVENTION

Briefly described, this invention provides an anode-fitting assembly to protect the metallic surface of a water tank, water heater or the like.

The fitting element of the assembly comprises a tubular connector member adapted to be secured to the wall of a water heater in electrical contact therewith and a first fluid passageway defined in said connector member. An intermediate member is secured to the connector member in electrical contact therewith. A second fluid passageway is defined in the intermediate member in communication with the first fluid passageway. A third fluid passageway provides communication from the exterior surface of the intermediate member to the second fluid passageway of the intermediate member. Impervious electrically insulating lining means is provided in said first, second and third passageways. Similarly, impervious electrically insulating covering means is provided on the exterior surface of the intermediate member.

In the preferred embodiment the anode element is connected to the fitting element by means of a generally cup-shaped joining member received about one end of the anode in electrical contact therewith. The outer surface of the joining member is essentially cylindrical and is press fitted into one end of the intermediate member of the fitting element in electrical contact therewith. When the electrode or anode is provided with a core wire, one end of the core wire is welded or otherwise firmly attached to the joining member in electrical contact therewith.

In a modification of the preferred embodiment the joining member is fitted into the intermediate member of the fitting and is retained in place by means of a weld. The anode is screw threadedly attached to the joining member.

DESCRIPTION OF THE INVENTION

A more complete description of the invention will now be made with reference to the attached drawings in which:

FIG. 1 is an elevational view, partly in cross-section, and showing the preferred embodiment of the anode-fitting assembly of this invention secured to the top wall of a water heater;

FIG. 2 is an exploded view of the several parts comprising the preferred embodiment of the anode-fitting assembly of this invention;

FIG. 3 is a cross-sectional view of the preferred embodiment of the anode-fitting assembly of this invention;

FIG. 4 is a partial cross-sectional view of the joint between the anode and fitting members in which a sealing gasket is interposed between a shoulder of the anode and the fitting member;

Figure 5:
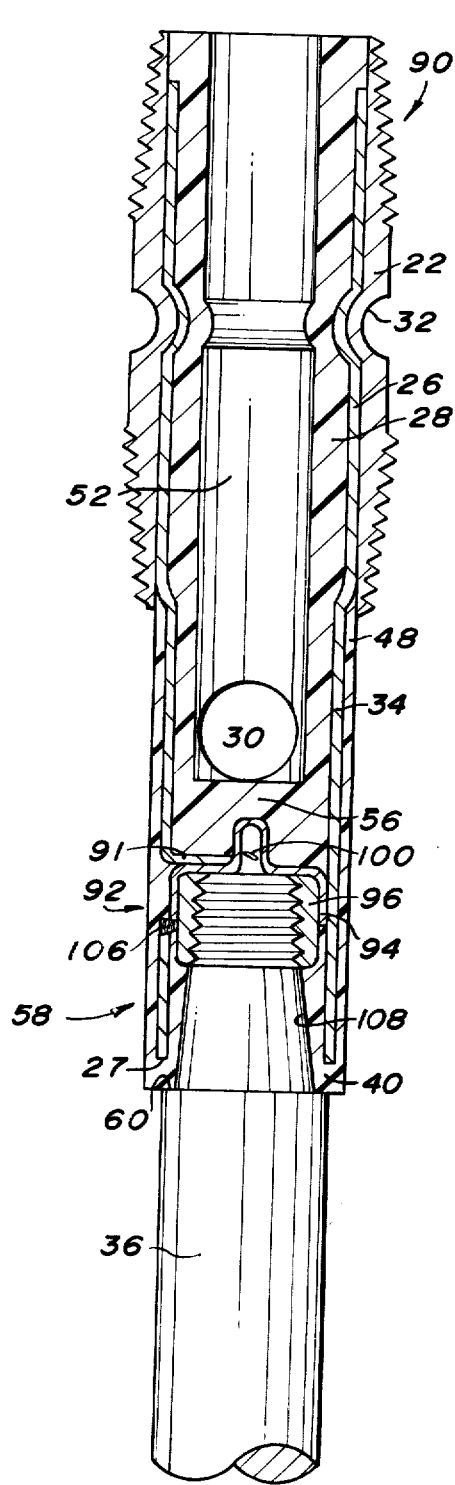
FIG. 5 is a cross-sectional view of a modified anode-fitting assembly of this invention.

Turning now to FIG. 1, there is shown an anode-fitting assembly 10 according to this invention received within an opening 12 defined within the top wall 14 of a water heater, heat exchanger, pipeline, hot water tank or the like. A spud 16 is welded or otherwise secured to the top wall 14 so as to overlie the opening 12. Internal threads 18 in the spud are adapted to cooperate with external threads 20 of the connector member 22 in order to provide support for the anode-fitting assembly. In the preferred embodiment of this invention, the end of the connector member 22 opposite threads 20 (i.e., the outer end of the connector member 22) is provided with external threads 24 for the attachment of a water line or for alternate purposes to be described more fully hereafter.

The threaded connection between the connector member 22 and the spud 16 of the top wall 14 as shown in FIG. 1 is the commercially acceptable manner of securing a fitting to a water heater. Within the scope of this invention, however, should be considered alternate structures for connecting the connector member 22 to the top wall 14 including weldments, sweat fittings and the like.

In FIG. 3, there is shown a cross-sectional view of the preferred embodiment of the anode-fitting assembly of this invention. Connector member 22 is defined more specifically as a end thereof and external threads 24 at the outer end thereof. A tubular intermediate member 26 is coaxial with the connector member 22 and is partially telescope within the inner end of the connector member 22. An impervious electrically insulating plastic lining 28 is provided within the tubular intermediate member 26 in contact with a portion of both the tubular intermediate member and the connector member and extends from a position flush with the outer end of the connector member 22 well within the tubular intermediate member 26 to a point below the transverse opening 30, as will be more fully described hereafter. The connector member 22 and the tubular intermediate member 26 are firmly locked together in electrical contact by rolling these respective members together by means of a die thus to distort or displace the metal of the connector member 22 thereby to produce an inwardly extending annular rib or corrugation 32. Lining 28 is similarly indented as it is disposed in contact with the internal wall of the tubular intermediate member 26 at rib 32. For a more complete description of the locking means producing the annular rib 32 reference is made to the Jacobson U.S. Pat. No. 3,093,161 and assigned to Perfection Corporation, Madison, Ohio, the assignee of the entire interest herein.

At a point slightly below the inner end of the connector member 22 the tubular intermediate member 26 is reduced at 34 for a purpose to be described more fully hereafter. The tubular intermediate member is further reduced at 35 where there is defined a generally cylindrical inner wall 38.

Attention is now directed to the exterior surface of the tubular intermediate member 26 wherein a nonmetallic impervious electrically insulating plastic covering 48 is provided for the purpose of rendering the external surface of the tubular intermediate member 26 electrically insulated and impervious to electrolytic fluid thus retarding or prohibiting altogether the corrosion of the tubular intermediate member 26. To this end, a casting is made about the external surface of the tubular intermediate member 26 thereby defining a generally annular impervious electrically insulating covering 48. From FIG. 3 it will be noted that covering 48 fills the free space adjacent the reduced portions 34, 35. Covering 48 further extends below the inner end 27 of the tubular intermediate member 26 thereby completely sealing such inner end from electrolytic fluid. Covering 48 extends upwardly into contact with the connector member 22 where the reduced portion 34 permits a small amount of plastic material to collect behind the connector member 22 as flash 50. It has been found that by providing a small amount of flash 50 behind the inner end of the connector member 22, a seal is thus defined at the inner end of the connector member 22 preventing entry of electrolytic fluid at the interface of the member 22 and 26, thus preventing localized corrosion at the area of joinder of the connector member and the tubular intermediate member. This seal is particular enhanced by the taper of the pipe thread 20 of connector member 22 which taper causes the threads to be squeezed radially inwardly into flash 50.

Turning now to the lower portion of covering 48 as shown in FIG. 3, it will be observed that there is provided a shoulder 40 defining a generally cylindrical inner wall 42 having a diameter approximately that of the inner wall 38 of the tubular intermediate member 26. Actually, the cylindrical inner wall 42 of the shoulder has a diameter slightly less than the cylindrical inner wall 38 of the tubular intermediate member since on cooling the plastic material of cover 48 tends to shrink. Such shrinkage at the shoulder 40 serves a beneficial sealing purpose as will be described more fully hereafter.

During the casting of covering 48 a slight amount of flash 44 is deposited at the inner wall 38 of the tubular intermediate member 26 as plastic material flows into the tubular intermediate member 26 a slight degree. Such flash 44 enhances sealing as will be described more fully hereafter.

In the embodiment of FIG. 3 a transverse opening 30 is defined in the assembly for the purpose of permitting entry of water from the hot water tank into the passageway 52 (defined within the connector member 22 and the tubular intermediate member 26) and thereafter to a suitable discharge pipeline. As shown in FIG. 3, transverse opening 30 extends completely through the covering 48, tubular intermediate member 26 and lining 28. Depending upon the volume of discharge required, one or several transverse openings 30 may be defined in the assembly. At the same time that the covering 48 is cast in place, a core is inserted in the transverse opening of the tubular intermediate member in order to permit a small amount of plastic material to flow about the wall defining the transverse opening thus providing overlapping insulation 54 (FIG. 3) to cover the metallic walls defining the transverse opening. Thus the tubular intermediate member is rendered completely impervious to electrolytic action and is insulated electrically from electrolytic fluid.

To complete insulation of the interior of the tubular intermediate member 26, a bottom wall 56 of plastic material is defined in the tubular intermediate member at the time the lining 28 is cast in place. Bottom wall 56 and lining 28 thus cooperate to define an impervious interior passageway 52 within the tubular intermediate member 26 and connector member 22 facilitating the flow of fluid from the water tank.

Briefly summarized, the fitting member of the anode-fitting assembly is comprised of the connector member 22, the tubular intermediate member 26, and the lining 28, covering 48, and bottom wall 56 cast in place.

In casting the plastic material a generally cylindrical core element is inserted into the tubular intermediate member closely adjacent the inner wall 38. Other core elements are inserted in the transverse opening of the tubular intermediate member and in the passageway 52. When assembly is completed, the fitting member includes a recess at one end thereof defined by the inner wall 42 of shoulder 40, inner wall 38 of the tubular intermediate member 26 and the bottommost surface 57 of the wall 56. The fitting further includes a lined passageway 52 and a lined transverse opening 30. As will be described more fully hereafter, the anode element is adapted to be received within the recess 58 of the fitting member.

As used in the description of the invention as shown in FIG. 3, the word "fitting" is intended to describe the connector member 22, tubular intermediate member 26 and the lining 28, bottom wall 56 and the associated covering 48. The word "anode" is intended to describe the electrode 36 and the joining member 68. The phrase "anode-fitting assembly" is intended to refer to the combination of the fitting and the anode.

Turning now to the anode element of the assembly, there is shown in FIG. 2 an electrode 36 having a specially configured upper end including a generally transverse shoulder 60, a reduced generally cylindrical surface portion 62, and a generally cylindrical free end 64. A core wire 66 extends from the electrode 36.

Adapted to be disposed over the specially configured electrode end is a joining member 68 which, as shown in FIG. 2, is a generally cup-shaped element having substantially cylindrical inner and outer walls 70, 72. The inner wall 70 of joining member 68 is adapted to be disposed about the free end 64 of the electrode in a press fit relationship. The end of core wire 66 is adapted to be received in an aperture 74 of the joining member. As is shown in FIG. 3, a spotweld 76 provides an electrical connection between core wire 66 and joining member 68.

The relationship of joining member 68 to the electrode 36 is such that with the joining member 68 disposed about the free end 64 of the electrode the external wall 72 of the joining member is approximately in the same plane as the reduced surface portion 62. This relationship will be evident from an inspection of FIG. 3.

Upon assembly of the joining member 68 to the electrode 36, the anode element is ready to be joined to the fitting.

Final assembly of the anode to the fitting is accomplished by disposing the specially configured upper end of the electrode with the attached joining member 68 into the recess 58 of the fitting with the external wall 72 of joining member 68 in a press fit relationship with respect to the inner wall 38 of the tubular intermediate member 26. An axial force is applied to either one or both of the anode and fitting members in order to complete assembly of these members as the joining member is forced into the inner wall 38 of tubular intermediate member 26 in a press fit relationship. Once assembled, as is shown in FIG. 3, the cylindrical walls 70, 72 of joining member 68 are entirely received within the recess 58 of the fitting with such cylindrical walls being disposed between (in a radial direction) the electrode and the wall of the fitting member defining recess 58.

Sealing of the anode-fitting assembly in the area of joinder of the anode to the fitting is accomplished in several ways. A sealing interface is provided as the shoulder 60 of electrode 36 contacts shoulder 40 of covering 48. Since shoulder 40 is defined by compressible plastic material a driving of the electrode 36 into the fitting enhances the seal between the shoulder 60 of the electrode and the shoulder 40 of the covering 48.

A further sealing relationship exists between the cylindrical inner wall 42 of shoulder 40 and the reduced surface portion 62 of the electrode. As was previously pointed out, there is a slight amount of shrinkage as the plastic material defining the shoulder 40 cools. This shrinkage tends to slightly reduce the diameter of the cylindrical inner wall 42 of shoulder 40 thus enhancing the interference fit between such wall and the reduced surfce portion 62 of the electrode.

Still further sealing of the joint between the anode and fitting is accomplished at the joining member 68 as the external wall 72 of such joining member is press fitted into the inner wall 38 of the tubular intermediate member 26. Flash 44 which, as previously noted, tends to form at the cylindrical inner wall 38 of the tubular intermediate member in the casting of the covering 48 serves to enhance sealing between the tubular intermediate member 26 and the joining member 68.

The net effect of the seals established in make up of the assembly as described above is to prohibit the entry of electrolytic fluid into the area of joinder of the anode and the fitting thus extending the life of the assembly.

A special relationship of the anode to the fitting will be noted in FIG. 3. Electrode 36 does not directly contact the tubular intermediate member 26. Rather, electrode 36 is electrically connected to the joining member 68 due to the direct press fitted contact of these members and the spotweld 76. The joining member 68 in turn is electrically connected to the tubular intermediate member 26 through a press fitted contact. There is not direct contact between the electrode 36 and the tubular intermediate member 26.

In the preferred embodiment the tubular intermediate member 26 and the joining member 68 are fabricated from steel. The electrode 36 is fabricated from magnesium. Thus there is a steel-to-steel contact between the tubular intermediate member 26 and the joining member 68. The exposed surface portion 62 of the electrode (which is magnesium) is in contact with the cylindrical inner wall 42 of shoulder 40 which, as previously has been noted, is cast from a plastic material. In the preferred embodiment there is no direct contact between the surface 62 and the inner wall 38. In an alternate embodiment the surface 62 may slightly overlap the inner wall 38.

In the preferred embodiment polypropylene compound number 6652 of Hercules Incorporated is used in the manufacture of the nonmetallic portions of the fitting. This compound tends to shrink inwardly when applied thus to enhance sealing of the metal surfaces against electrolytic fluid. Other materials such as epoxy, resins, Bakelite, or fomaldehyde compounds may be used.

A modification of the preferred embodiment of the invention is shown in FIG. 4. In this modification sealing between the anode and the fitting has been enhanced through the addition of an annular gasket 78 between shoulder 60 of electrode 36 and the shoulder 40 of covering 48. In all other respects the structure of FIG. 4 is identical to that of FIG. 3. Gasket 78 may be fabricated from any suitable material such as elastomeric materials or plastic materials well known to those skilled in the art.

Figure 7:
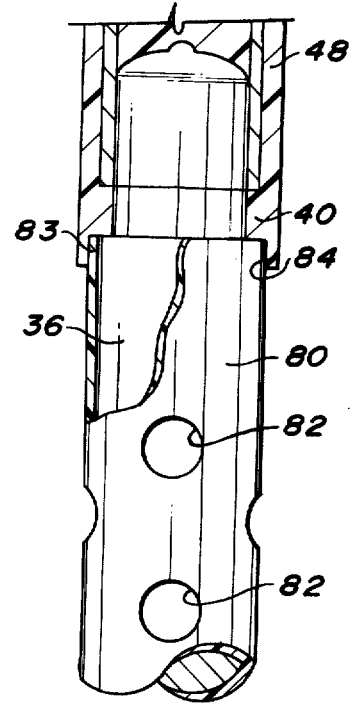
FIG. 7 is a partial cross-sectional view of the joint between the anode and fitting members and showing a sheath about the anode.
Figure 8:
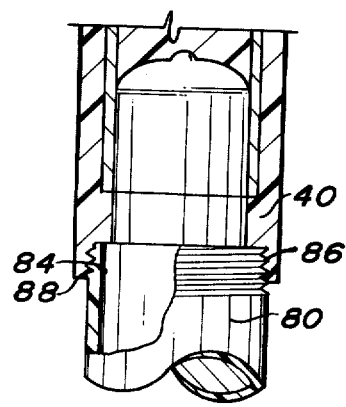
FIG. 8 is a partial cross-sectional view similar to FIG. 7 and showing a modification of the sheath structure.

Still further modifications of the preferred embodiment of the invention are shown in FIGS. 7 and 8.

In FIG. 7 a sheath 80 is disposed about the electrode 36. Sheath 80 is defined by a plurality of apertures 82 which serve to reduce the exposed surface area of the electrode 36 to electrolytic fluid thus to inhibit somewhat the corrosion of the electrode in the presence of electrolytic fluid. A recess 84 is defined in shoulder 40 of covering 48 for the purpose of receiving the generally cylindrical upper end 83 of sheath 80. Sheath 80 is fabricated from any suitable nonmetallic material and is joined to covering 48 in any suitable manner known to those skilled in the art such as by the use of adhesives, plastic welding, etc. In all other respects the structure of FIG. 7 is identical to the preferred embodiment of FIG. 3.

In FIG. 8 the sheath 80 is joined to the shoulder 40 by means of external threads 86 defined on the sheath adapted to engage internal threads 88 defined in the recess 84 of shoulder 40. In all other respects the structure of FIG. 8 is identical to the preferred embodiment of FIG. 3.

Figure 6:
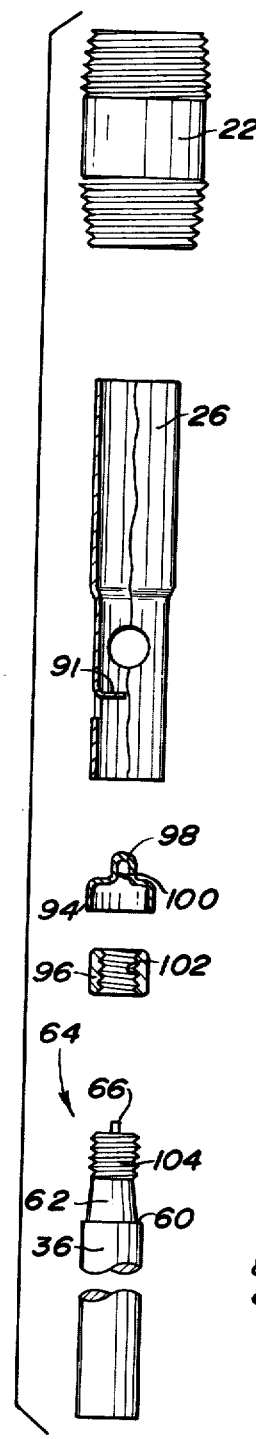
FIG. 6 is an exploded view of the several parts comprising the modified embodiment of the anode-fitting assembly of this invention as shown in FIG. 5.

A more substantial modification to the invention than that described with reference to FIGS. 4, 7 and 8 is shown in FIGS. 5 and 6. Where possible, similar reference characters will be used as were used in connection with the description of the preferred embodiment.

Thus there is shown in FIG. 5 an anode-fitting assembly 90 including a fitting member and an anode member. The fitting member is comprised of a connector member 22 joined to a tubular intermediate member 26 in electrical contact by means of rib or corrugation 32. A lining 28 made from impervious electrically insulating plastic material is provided at the interior of the tubular intermediate member 26 and the connector member 22. A generally transverse lined opening 30 is defined in the tubular intermediate member 26 and extends through the lining 28 and exterior covering 48. Like lining 28, exterior covering 48 is defined by an impervious electrically insulating material.

The tubular intermediate member 26 of FIG. 5 is reduced at 34 where a constant diameter is maintained to the inner end 27.

The primary difference between the structures of FIG. 5 and that shown in FIG. 3 is with respect to the joint between the anode and the fitting of the assembly.

As is shown in FIG. 6, the tubular intermediate member 26 is provided with an inwardly struck tang or finger 91 which functions to provide a locating surface for the joining member 92 (FIG. 5). Joining member 92 is a two piece structure made up of wire receiving element 94 and threaded member 96. Wire receiving element 94 is generally cup-shaped and includes a projection 98 and a slight inwardly struck boss 100. The purpose for projection 98 and boss 100 will become apparent as the description proceeds.

Received within the wire receiving element 94 in a press fit relationship is the threaded member 96 which is generally annular in shape having an external diameter slightly less than the internal diameter of the wire receiving element 94. The internal surface of the threaded member is provided with threads 102 adapted to be complementary to the external threads 104 of the anode.

The joining member 92 comprised of the wire receiving element 94 and threaded member 96 is retained in the position of FIG. 5 by means of weld 106. Alternately the joining member may simply be press fitted into the tubular intermediate member.

In assembly of the fitting as shown in FIG. 5 the connector member 22 is first joined to the tubular intermediate member 26. Thereafter the joining member 92 comprising the wire receiving element 94 and the threaded member 96 is inserted into the tubular intermediate member until the wire receiving element 94 abuts tang 91. These members are then secured to one another by the placement of weld 106. In the final step of the manufacturing process of the fitting the lining 28, bottom wall 56 and covering 48 are cast in place using any well known impervious electrically insulating material such as plastic. Suitable cores are used to define the lined passageway 52, lined opening 30 and the recess 58.

The completed fitting of FIG. 5 has a recess 58 at one end thereof defined by the threaded member 96 and covering 48 which includes a shoulder 40 and an internal wall 108 generally frusto-conical in shape.

As will be seen in FIG. 6, the electrode 36 is provided with a specially machined upper end that includes a generally transverse shoulder 60, reduced generally frusto-conical surface portion 62 and a threaded free end 64. A core wire 66 projects from the free end 64.

When it is desired to assemble the anode to the fitting, the free end of the electrode is inserted into the recess 58 of the fitting causing the complementary threads 104 of the electrode to become engaged with the threads 102 of the fitting. Relative rotation of the electrode with respect to the fitting causes a locking of these members as the reduced surface portion 62 of the electrode comes into contact with the internal wall 108 of the fitting. During assembly the core wire 66 is received within the projection 98 of wire receiving element 94. An electrical contact is made between core wire 66 and the wire receiving element 94 as the core wire 66 is caused to engage boss 100. Boss 100 functions somewhat like the segment of a thread in causing an interference fit to be established between the wire receiving element 94 and the core wire. As will be observed from FIG. 5, boss 100 is struck slightly at an angle to the horizontal thus imparting somewhat of a helix thread segment to the wire receiving element 94.

Once assembled in the configuration of FIG. 5 the fitting and anode comprise an assembly that is ready to be installed in a water heater. Sealing at the joint between the anode and the fitting is accomplished in several ways. A seal is affected at the interface of the shoulder 60 of the electrode and the shoulder 40 of covering 48 of the fitting. An additional seal is affected at the interface of the reduced surface portion 62 of the electrode and the internal wall of 108 of the fitting. Finally a certain amount of thread sealing is accomplished at the interface of threads 102, 104 of the electrode and the threaded member 96.

Sealing in the structure of FIG. 5 may be enhanced still further through the addition of a gasket between the shoulder 60 of the electrode and the fitting itself in a manner similar to that shown in FIG. 4. As a further alternative embodiment of the structure of FIG. 5, a suitable sheath structure may be added to the electrode 36 and secured at the upper end to the covering 48 of the fitting in a manner similar to that shown in FIGS. 7 and 8 or in a further alternate manner well known to those skilled in the art.

In the several embodiments of this invention that are shown in the drawings, the electrode 36 has been provided with a core wire 66. In the joint structures of FIGS. 3 and 5 provisions have been made to facilitate electrical contact between the core wire and the tubular intermediate member of the fitting. within the spirit of this invention should be considered structures wherein electrodes are used that do not have a core wire. It should be noted, however, that the core wire has the principal advantage of providing structural support for the electrode as advanced corrosion of the electrode takes place.

Further modifications of the end of the anode of this invention are shown in FIGS. 9-12.

Figure 9:
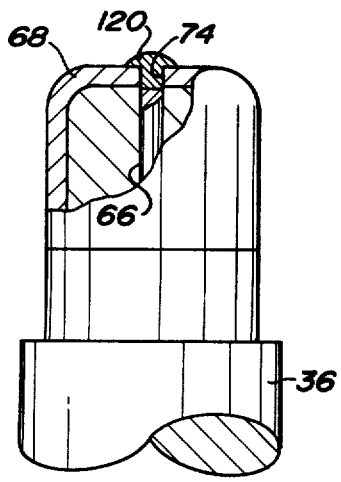
FIG. 9 is a partial cross-sectional view and showing a modification of the end of the anode of this invention.

In FIG. 9 joining member 68 is received about the free end of electrode 36 in a press fit relation as previously described with reference to the preferred embodiment of FIG. 3. An electrical connection between the core wire 66 of the electrode and the joining member 68 is accomplished by means of a stud 120 having one end disposed within aperture 74 of the joining member. As shown in FIG. 9, stud 120 makes electrical contact with both core wire 66 and joining member 68. The stud may be retained within the walls defining aperture 74 by several means known to those skilled in the art including an interference fit or a weld. The stud may also be fusion welded to the core wire.

Figure 10:
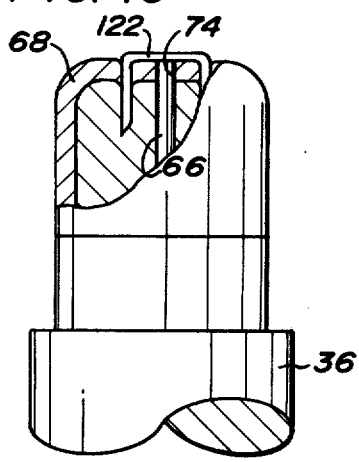
FIG. 10 is a partial cross-sectional view similar to FIG. 9 and showing a further modification of the end of the anode of this invention.

In FIG. 10 a still further modification of the joining structure at the end of the electrode is shown. Core wire 66 extends through aperture 74 of joining member 68. A staple 122 is driven through the joining member into the free end of the electrode 36. As shown in FIG. 10, the staple is in contact with the free end of the core wire 66 thus providing for an electrical connection between these parts. If desired, a weld can be placed at the end of the core wire 66 in order to provide an alternate electrical connection between the core wire 66 and the joining member 68. Staple 122 of FIG. 10 functions to provide for additional joining means between the joining member 68 and the free end of the electrode thus rendering more difficult the removal of the electrode from the joining member 68.

Figure 11:
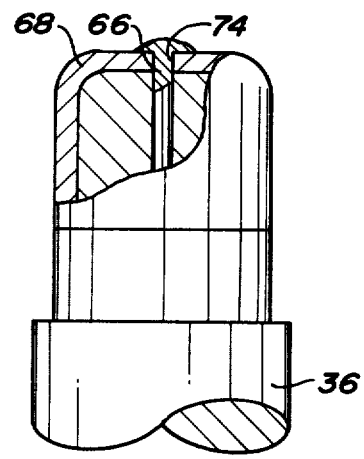
FIG. 11 is a partial cross-sectional view similar to FIG. 9 and showing a still further modification of the end of the anode of this invention.

In FIG. 11 a still further modification of the joining structure at the free end of the electrode is shown. In the structure of FIG. 11 the core wire 66 extends through aperture 74 of joining member 68. Through an upsetting operation the free end of the core wire is caused to be deformed into the generally rivet head shape as shown in FIG. 11. Thus, the structure of FIG. 11 utilizes the parent material of the core wire in order to provide a firm electrical connection between the core wire and the joining member 68. If desirable, fusion welding may be used to further enhance contact of the joining member and the core wire.

Figure 12:
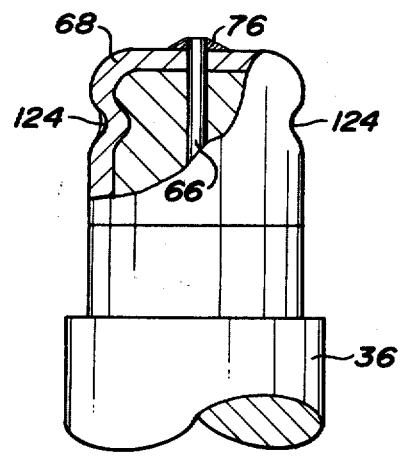
FIG. 12 is a partial cross-sectional view similar to FIG. 9 and showing a still further modification of the end of the anode of this invention.

In FIG. 12 a still further modification of the joining structure at the free end of the electrode is shown. Core wire 66 of FIG. 12 is joined to the joining member 68 in a manner similar to that shown in FIG. 3. Weld 76 provides for firm electrical contact between the core wire and the joining member. In addition, the structure of FIG. 12 includes an indentation 124 which causes a portion of the joining member to be struck inwardly into the free end of the electrode 36. Indentation 124 may be formed by a ball or other such member brought into contact with the external surface of joining member 68. One or more indentations may be provided in the joining member as desired. Like staple 122 of FIG. 10, indentations 124 of FIG. 12 serve to increase the rigidity of the joint between the joining member and the free end of the electrode thus to render more difficult the removal of the electrode from the joining member 68.

ADVANTAGES OF THE INVENTION

As will now be apparent, a primary advantage of this invention is the fact that manufacture and completion of the fitting itself may be accomplished prior to joining the anode to the fitting. Thus, in utilizing the teaching of this invention, a water heater manufacturer may, at its option, manufacture the complete anode-fitting assembly after securing suitable fittings and anodes from suppliers of its choice. The necessity of procuring the entire assembly from one source has thus been eliminated. In addition, the necessity of molding the anode into the fitting (which heretofore was encumbent on the fitting manufacturer) has been eliminated. Utilizing the principles of this invention the fitting manufacturer can provide the basic fitting itself without the necessity of joining the electrode to such fitting. Similarly, an electrode supplier can provide those elements which it is most capable of supplying, i.e., the electrode, without the necessity of manufacturing a fitting.

Several significant features of the invention should be emphasized at this time.

The tubular intermediate member 26 physically separates and insulates the external surface of the electrode 36 from the external surface of the connector member 22. This separation is enhanced by an impervious electrically insulating covering 48 rendering the external surface of the tubular intermediate member 26 electrically insulated and impervious to electrolytic action. Other elements of the fitting are similarly rendered impervious to electrolytic action.

The electrical connection between the electrode 36 and the connector member 22 is accomplished entirely out of contact with the electrolytic solution in the water tank. Electrical contact between the tubular intermediate member and the core wire of the electrode is made inside the recess 58 which itself is sealed from electrolytic fluid. The entire connector member 22 is, in fact, disposed substantially above the liquid level of the water in the water heater. Furthermore, flash 50 serves to seal the interface of the members 22, 26. The internal passageway 52 is rendered impervious to electrolytic action through the cooperation of the lining 28 and the bottom wall 56.

The tubular intermediate member 26 serves as a convenient conduit for the flow of fluid from the water heater in the event it is desired to utilize the anode-fitting assembly of this invention in combination with either an outlet for a water heater or a relief valve or for both functions.

It should be emphasized that whereas the embodiment of FIG. 3 is directed to an anode-fitting assembly which includes a water outlet, this invention in its broadest form in directed to an anode-fitting assembly wherein a tubular intermediate member is utilized to substantially separate the electrode from the water heater connector member and wherein the electrode may be releaseably attached to the fitting member. While it is considered convenient to utiize the tubular intermediate member as a fluid passageway as is shown in FIG. 3, this invention should not be considered limited to a fluid passageway in combination with an anode fitting.

While, from a manufacturing standpoint, it is desirable to fabricate the fitting from a connector member and a tubular intermediate member, one piece structures including a nipple with a tubular extension at one end thereof should be considered within the spirit of this invention.

The choice of materials of the various elements comprising the anode-fitting assembly of this invention may vary depending upon particularly requirements. Since water heaters, water tanks and pipelines are usually constructed of ferrous metal, the electrode material may be selected from a group including, but not limited to, more active electrochemical metals such as magnesium, aluminum, and zinc. Similarly, core wire in the electrode, if present, may be manufactured of several metals with steel being preferred. The tubular intermediate member 26 of the preferred embodiment is fabricated of steel although other metals may be used. Similarly, the connector member 22 may be fabricated from one of several metals with steel being preferred. The particular choice of material in each case would depend upon many factors including the characteristic of the metal to be protected. Since water tanks and water heaters are generally fabricated from steel sheet, it is preferred that the connector member 22, tubular intermediate member 26 and the core wire be similarly fabricated from steel. The lining 28 and covering 48 may be fabricated from any suitable impervious electrically insulating material such as polypropylene. As has been previously noted, the preferred embodiment utilizes polypropylene compound number 6652 of Hercules Incorporated.

What is claimed is:

1. An anode-fitting assembly for a water heater or the like comprising in combination:
    a fitting member adapted to be secured to the wall of such water heater in electrical contact therewith, said fitting member having an interior wall defining a recess at one end thereof;
    an anode member comprising:
       an electrode,
       a joining member received about one end of said electrode,
       said joining member and said one end of said electrode being disposed in said recess of said fitting member,
       said joining member having a cylindrical portion the inner wall of which is in physical and electrical contact with the exterior surface of said electrode and the exterior wall of which is in physical and electrical contact with said wall defining said recess of said fitting member such that with said electrode assembled to said fitting member said cylindrical portion is entirely received within said recess and, in a radial direction, is located between said electrode and said fitting member and provides an electrical interconnection between said electrode and said fitting member,
    the relationship of said anode member to said fitting member being such that with said joining member received within said recess fluid in such water heater is substantially prohibited from contact with said one end of said electrode, said joining member and said wall defining said recess of said fitting member.

2. The invention of claim 1 in which said joining member is generally cup-shaped having substantially cylindrical outer and inner walls with said inner wall press fitted about said one end of said electrode and said outer wall press fitted into said wall defining said recess of said fitting member.

3. The invention of claim 1 in which said electrode is provided with a core wire, one end of which is attached to said joining member.

4. The invention of claim 1 in which said fitting member and said joining member are fabricated from ferrous metal and said electrode is fabricated from magnesium.

5. The invention of claim 1 in which said fitting member is provided with an electrically insulating and impervious covering means on the exterior surface of the portin of said fitting member that is received within such water heater, said covering means contacting said electrode in substantially sealing relationship.

6. The invention of claim 1 in which said electrode is maintained out of direct contact with said wall of said fitting member with electrical interconnection between these members provided by said joining member.

7. An anode-fitting assembly for a water heater or the like comprising in combination:
 a fitting member comprising;
  a connector member adapted to be secured to the wall of such water heater in electrical contact therewith and having means at its outer end for the attachment of a water line;
  a first fluid passageway in said connector member;
  an intermediate member extending from said connector member in electrical contact therewith, said intermediate member having an internal wall defining a recess at one end thereof;
  a second fluid passageway in said intermediate member in communication with said first fluid passageway;
  a third fluid passageway providing communication from the exterior surface of said intermediate member to said second fluid passageway;
  electrically insulating and impervious lining means in said first, second and third passageways;
  electrically insulating and impervious covering means on the exterior surface of said intermediate member;
 an anode member comprising;
  an electrode,
  a joining member received about one end of said electrode,
  said joining member having substantially cylindrical outer and inner walls with said cylindrical inner wall press fitted about an end portion of said one end of said electrode,
  said electrode being provided with a cylindrical portion substantially adjacent said joining member,
  said outer wall of said joining member being press fitted into said wall defining said recess of said intermediate member a distance sufficient that said joining member is substantially wholly received within said recess and said cylindrical portion of said electrode is outside of said recess,
  said electrode being provided with a core wire, one end of said core wire being attached to said joining member within said recess,
  said covering means on the exterior surface of said intermediate member defining, adjacent said recess of said intermediate member, an internal cylindrical surface of substantially the same diameter as said cylindrical portion of said electrode whereby, upon insertion of said anode member into said fitting member said covering means contacts said cylindrical portion of said electrode in substantially sealing relationship.

8. The invention of claim 7 in which said electrode is provided with a shoulder substantially adjacent said cylindrical portion, said shoulder being adapted to contact said covering means in substantially sealing relationship.

9. An anode-fitting assembly for a water heater or the like comprising in combination:
 a fitting member adapted to be secured to the wall of such water heater in electrical contact therewith, said fitting member having a wall defining a recess at one end thereof, said recess being provided internally therein with a joining member defined by an internally threaded element and a wire receiving element received about said internally threaded element in electrical contact therewith, said wire receiving element being secured to said fitting member in electrical contact therewith,
 an electrode,
  said electrode being provided with an end portion having external threads thereon and a core wire extending from said end portion a short distance,
  said end portion of said electrode being screw threadedly received within said joining member with said core wire of said electrode being received within said wire receiving element,
 electrically insulating and impervious covering means on the portion of the exterior surface of said fitting member received within such water heater,
 said covering means contacting said electrode in substantially sealing relationship.

10. The invention of claim 9 in which said electrode is provided with a substantially frusto-conical surface adjacent the external threads thereof and said covering means of said fitting member defines, within said recess of said fitting member, a substantially complementary frusto-conical surface adapted to engage said electrode frusto-conical surface when received within said fitting member in substantially sealing relationship.

11. An anode-fitting assembly for a water heater or the like comprising in combination:
 a fitting member adapted to be secured to the wall of such water heater in electrical contact therewith, said fitting member having an inerior wall defining a recess at one end thereof;
 electrically insulating and impervious covering means on the exterior surface of the portion of said fitting member that is received within such water heater;
 an anode member comprising:
  an electrode,
  a joining member received about one end of said electrode,
  said joining member and said one end of said electrode being disposed in said recess of said fitting member,
  said joining member having substantially cylindrical inner and outer walls, said inner wall being in physical and electrical contact with the exterior surface of said electrode and said outer wall being in physical and electrical contact with wall defining said recess of said fitting member such that with said electrode assembled to said fitting member said cylindrical walls are received within said recess and, in a radial direction, are located between said electrode and said fitting member and provide an electrical interconnection between said electrode and said fitting member, said covering means defining at said recess a sealing surface which is adapted to contact said electrode in substantially sealing relationship whereby, with said joining member received within said recess fluid in such water heater is substantially prohibited from contact with said one end of said electrode, said joining member and said wall defining said recess of said fitting member.

12. The invention of claim 11 in which said fitting member comprises;

a connector member adapted to be secured to the wall of such water heater in electrical contact therewith and having means at its outer end for the attachment of a waterline;

a first fluid passageway in said connector member;

an intermediate member extending from said connector member in electrical contact therewith, said intermediate member having an internal wall defining a recess at one end thereof;

a second fluid passageway in said intermediate member in communication with the first fluid passagewy;

a third fluid passageway providing communication from the exterior surface of said intermediate member to said second fluid passageway;

electrically insulating and impervious lining means in said first, second and third passageways;

said covering means being provided on the exterior surface of said intermedate member.

13. The invention of claim 11 in which said inner wall and said outer wall of said joining member engage said electrode and said wall defining said recess of said fitting member respectively in a press fit relationship.

14. The invention of claim 11 in which securing means is provided to retain said electrode within said inner wall of said joining member.

15. An anode-fitting assembly for a water heater or the like comprising in combination:

a fitting member adapted to be secured to the wall of such water heater in electrical contact therewith, said fitting member having an interior wall defining a recess at one end thereof;

an anode member comprising;

an electrode, a joining member received about one end of said electrode, said joining member and said one end of said electrode being disposed in said recess of said fitting member, said joining member having substantially cylindrical inner and outer walls, said inner wall being in electrical contact with said electrode in a press fit relationship and said outer wall being in electrical contact with said wall defining said recess of said fitting member in a press fit relationship such that with said electrode assembled to said fitting member, said cylindrical walls are located between said electrode and said fitting member and provide an electrical interconnection between said electrode and said fitting member, the press fit relationship of said inner wall to said electrode and said outer wall to said wall defining said recess of said fitting member being such that fluid is substantially prohibited from contact with said one end of said electrode, said joining member and said wall defining said recess of said fitting member, the relationship of said electrode to said fitting member being such that there is no direct physical contact of said electrode with said fitting member.

* * * * *